(12) United States Patent
Griffin et al.

(10) Patent No.: US 10,801,574 B2
(45) Date of Patent: Oct. 13, 2020

(54) DYNAMIC SHAPE MAINTENANCE OF AEROSPACE SUBSYSTEMS USING TUNED MASS DAMPERS

(71) Applicant: The Boeing Company, Chicago, IL (US)

(72) Inventors: Steven F. Griffin, Kihei, HI (US); Guy D. Granger, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 14/699,283

(22) Filed: Apr. 29, 2015

(65) Prior Publication Data
US 2016/0319895 A1 Nov. 3, 2016

(51) Int. Cl.
*F16F 7/104* (2006.01)
*B64D 7/00* (2006.01)
*F16F 7/10* (2006.01)

(52) U.S. Cl.
CPC ............... *F16F 7/104* (2013.01); *B64D 7/00* (2013.01); *F16F 7/1011* (2013.01)

(58) Field of Classification Search
CPC .......... F16F 7/10; F16F 7/1005; F16F 7/1011; F16F 7/104; F16F 15/02
See application file for complete search history.

(56) References Cited

U.S. PATENT DOCUMENTS

| | | | | |
|---|---|---|---|---|
| 3,601,228 A | * | 8/1971 | Nashif | F16F 7/108 188/268 |
| 3,804,210 A | * | 4/1974 | Erickson | F16L 55/04 174/42 |
| 4,724,923 A | * | 2/1988 | Waterman | F16F 15/03 181/208 |
| 5,348,124 A | * | 9/1994 | Harper | B64G 1/36 188/378 |
| 5,915,508 A | * | 6/1999 | Lai | F16F 1/387 188/379 |
| 6,032,552 A | * | 3/2000 | Alleai | F16F 7/10 248/562 |
| 6,062,526 A | * | 5/2000 | Morgenthaler | F16F 15/04 188/380 |
| 6,116,389 A | * | 9/2000 | Allaei | E04H 9/02 123/192.1 |
| 6,161,664 A | * | 12/2000 | Brevart | F16F 15/005 188/379 |
| 7,113,064 B2 | * | 9/2006 | Loubat | F16F 7/1011 335/220 |
| 8,302,748 B2 | * | 11/2012 | Retat | B64G 1/641 188/379 |

(Continued)

*Primary Examiner* — Bradley T King
(74) *Attorney, Agent, or Firm* — Felix L. Fischer

(57) ABSTRACT

A vibration damping system employs a component having a directionally sensitive element thereon, mounted to an aircraft, which experiences dynamic excitation that induces bending deflection in the component that will reorient the directionally sensitive element. At least one tuned mass damper is mounted on the component in an orientation in which an internal mass of the tuned mass damper is moveable such that the tuned massed damper absorbs and attenuates at least a portion of the deflective motion, to thereby suppress bending deflection of the component in the particular axial direction and generally maintain the linearity of the directionally sensitive element.

21 Claims, 12 Drawing Sheets

(56) References Cited

U.S. PATENT DOCUMENTS

2005/0279599 A1* 12/2005 McPherson ............. F16F 7/108
                                                      188/379
2012/0126665 A1*  5/2012 Szwedowicz ............ F01D 5/16
                                                      310/319
2013/0092489 A1*  4/2013 Hagelin ................... F16F 7/116
                                                      188/379

* cited by examiner

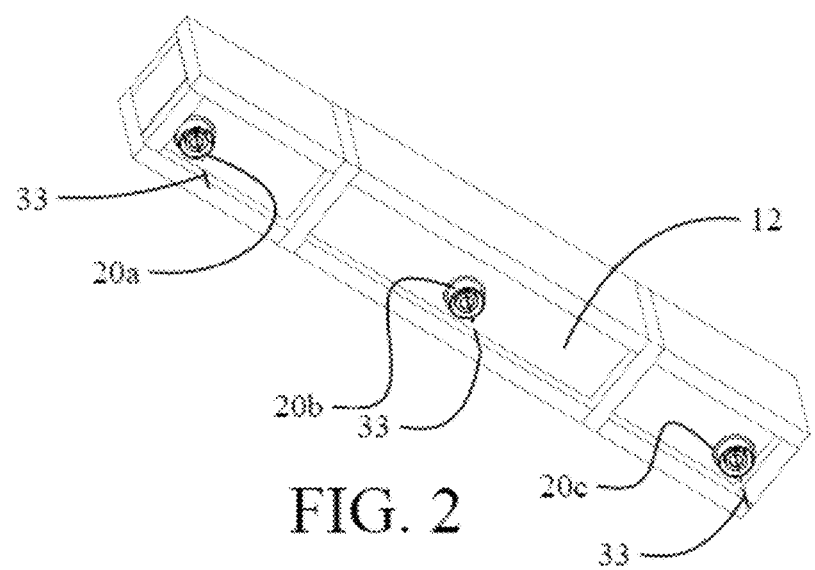
FIG. 2
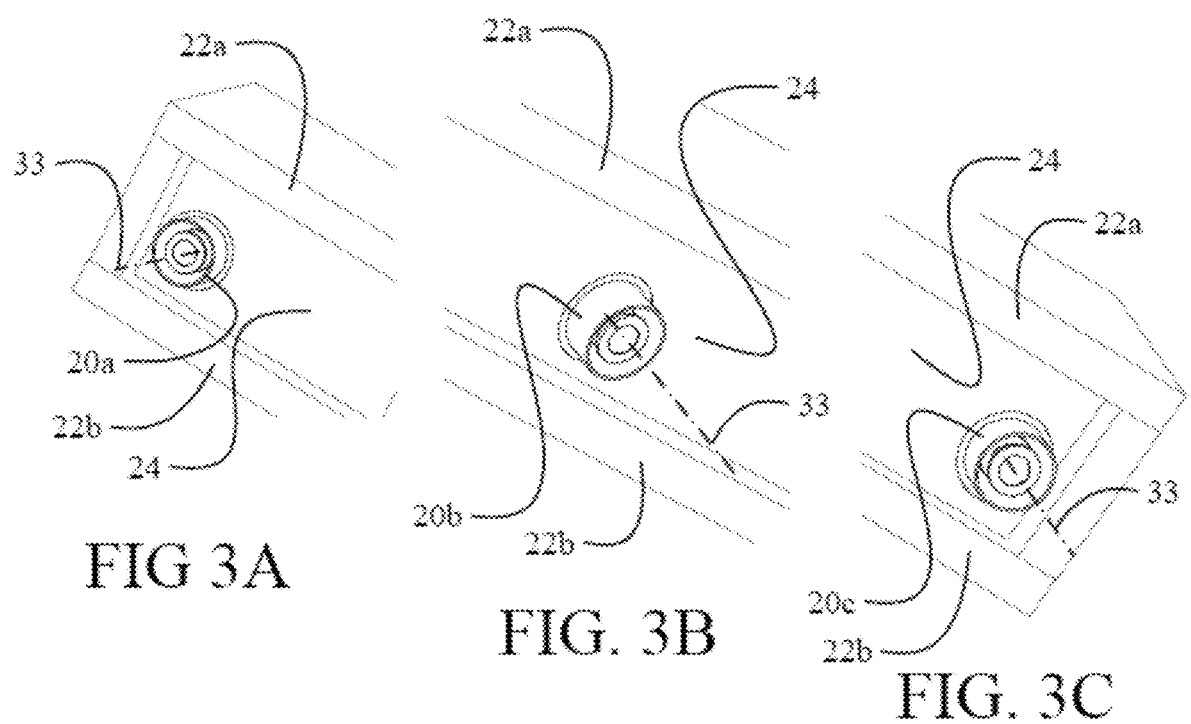
FIG 3A
FIG. 3B
FIG. 3C

DYNAMIC SHAPE MAINTENANCE OF AEROSPACE SUBSYSTEMS USING TUNED MASS DAMPERS

REFERENCE TO GOVERNMENT FUNDED CONTRACTS

"This invention was made with Government support awarded by The Department of Defense. The government has certain rights in this invention."

BACKGROUND INFORMATION

1. Field

Embodiments of the disclosure relate generally to vibration damping systems and more particularly to a system employing tuned mass dampers to maintain linearity of a directionally sensitive element of a component in an environment inducing vibration.

2. Background

Many systems such as an antenna or a beam director, such as a laser designator or weapon, which may be mounted on an aircraft or other vehicle, may be distributed spatially such that overall shape, in the case of an antenna, or line of sight, in the case of a laser, must be preserved in order for the subsystem to operate. Quasi-static forces such as lift and drag can be designed for by insuring that the subsystem has sufficient static stiffness. As an example, an aircraft dynamic environment, including aerodynamic and base vibration, also requires consideration of dynamic forces, especially for large subsystems, where the first vibration mode frequency lies well within the frequency range where dynamic forces are large. Unfortunately, a very efficient static structure that has a very high stiffness-to-weight ratio (for example a graphite epoxy structure) usually has very few loss mechanisms. This means the vibration modes will be lightly damped, further aggravating the dynamic problem with large amplification of dynamic forces that translate into large dynamic excursions from the overall shape required for subsystem performance.

It is therefore desirable to provide a system for maintaining shape or linearity of a mounted system.

SUMMARY

Exemplary embodiments provide a vibration damping system employing a component having a directionally sensitive element thereon, mounted to an aircraft, which experiences dynamic excitation that induces bending deflection in the component that will reorient the directionally sensitive element. At least one tuned mass damper is mounted on the component in an orientation in which an internal mass of the tuned mass damper is moveable such that the tuned massed damper absorbs and attenuates at least a portion of the deflective motion, to thereby suppress bending deflection of the component in the particular axial direction and generally maintain the linearity of the directionally sensitive element.

The embodiments provide a method for applying a tuned mass damper apparatus to an aircraft component. A component having a directionally sensitive element thereon mounted to an aircraft is identified. A particular axial direction is identified in which a bending deflection is induced by dynamic excitation of the component, which causes reorientation of the directionally sensitive element. At least one tuned mass damper is mounted onto the component in an orientation in which an adjustable internal mass of the tuned mass damper is moveable only in the particular axial direction, such that the tuned massed damper absorbs and attenuates the deflective motion in the component in the specific axial direction, to thereby suppress bending deformation of the component in the axial direction for maintaining the linearity of the directionally sensitive element.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings wherein

FIG. 2 is a perspective view of the directionally sensitive element with tuned mass dampers (TMDs) attached;

FIGS. 3A-3C are detailed views of the TMDs as installed;

DETAILED DESCRIPTION

The system and methods described herein provide vibration control with application of one or more tuned mass dampers to a mounted component, by identifying an axial direction in which vibrational/dynamic excitation induces deflection and movement affecting a directionally sensitive element, and mounting the tuned mass dampers onto the component at nodes of vibration maxima in an orientation in which an internal mass is moveable only in the particular axial direction, such that the tuned massed dampers attenuate the deflective motion in the specific axial direction to thereby maintain directional stability for the directionally sensitive element.

Figure 1A:
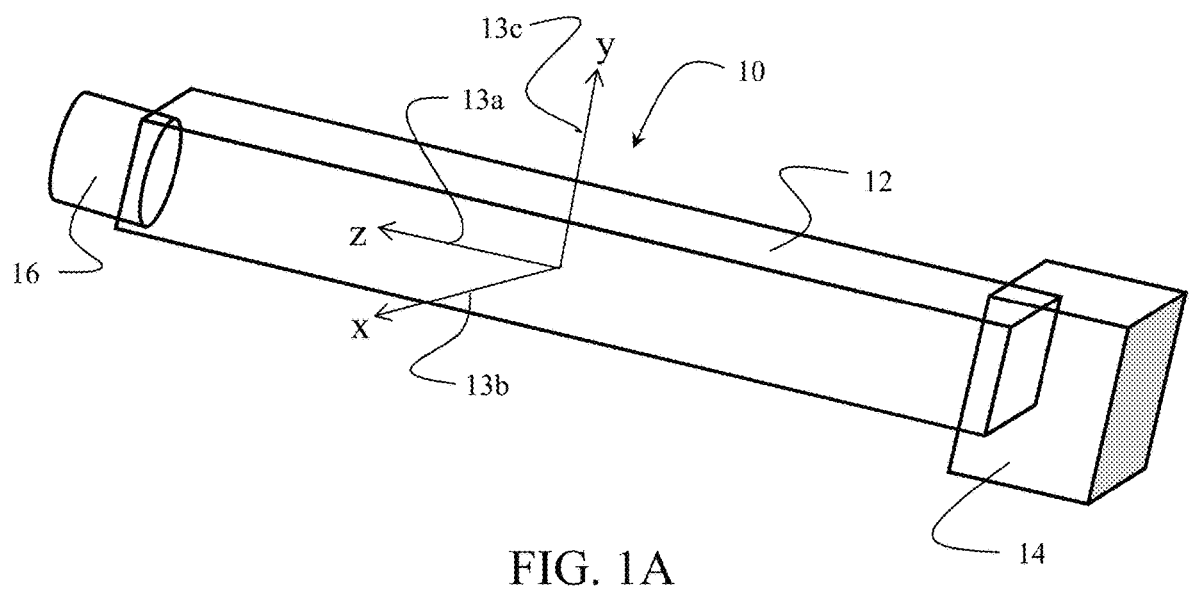
FIG. 1A is a perspective block diagram representation of a component with which the present embodiments may be employed.

Referring to the drawings, an example component 10 is shown in FIG. 1A. The example component 10 incorporates a large rectangular tube 12 that might be mounted to a large aircraft to be used to direct a laser beam in a direction along a z-axis 13a from a laser source 14 at the minus z side of the tube to a laser focusing element 16 on the plus z side of the tube. Since the tube 12 maintains alignment of the laser source 14 and laser focusing element 14 the tube is a directionally sensitive element and bending of the tube may impair the efficient functioning of the desired laser beam emission. For the example component 10, aerodynamic or other vibration inducing loads may cause deformation of the tube 12. A first vibration mode could be as demonstrated in FIG. 1B where the undeflected tube 12 is shown with the tube 12' at maximum deflection or excursion created by the first vibration mode superimposed. In the example shown, the deflection is created in the direction of the x-axis 13b. In alternative operational examples deflections or excursions could be principally in the direction of the y-axis 13c.

Figure 1B:
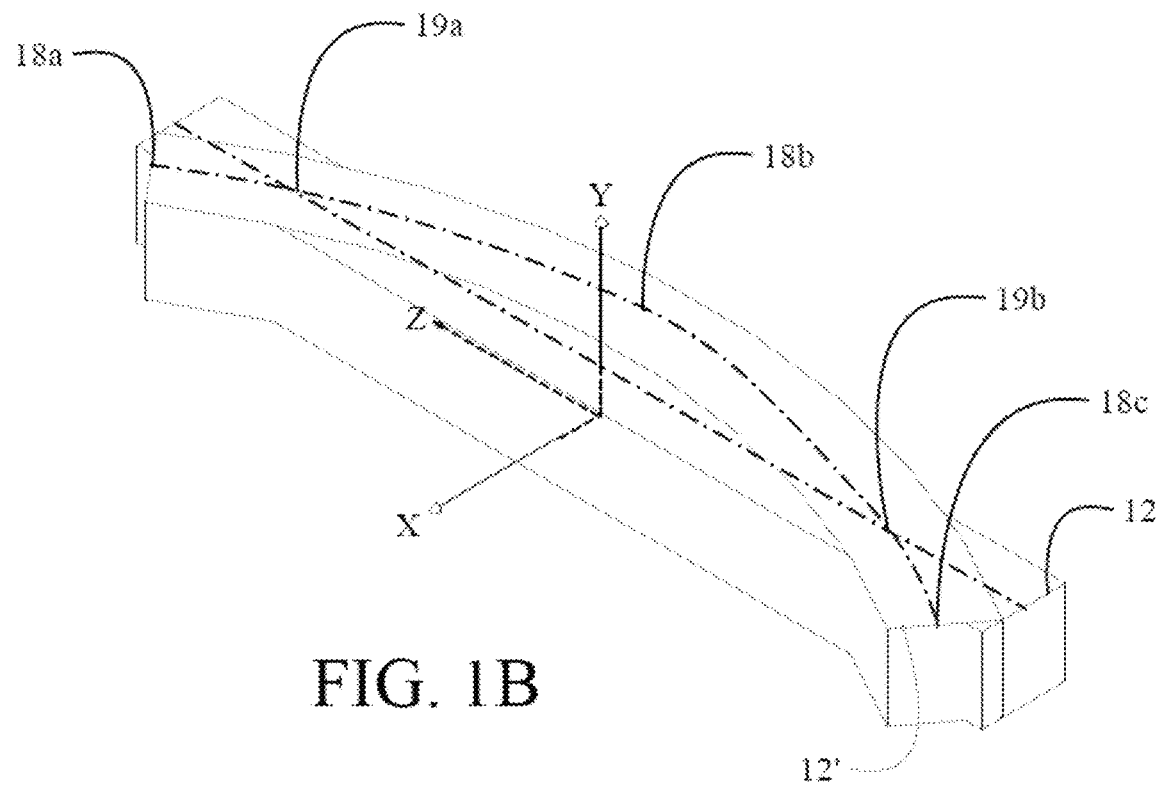
FIG. 1B is an overlay view demonstrating deflection of a tube as a directionally sensitive element of the component of FIG. 1A.

For the example, tube 12 is a carbon composite structure of approximately 7000 lbs with the depicted initial mode shape induced at 24 Hz. As seen in FIG. 1B, the maximum excursions of the structure of the tube 12' occur at a central antinode 18b and at antinodes 18a and 18c at the ends of the tube. At nodes 19a and 19b, there is substantially no excursion of the tube 12'. In order for the beam director to perform its function, the overall straight tube shape must be maintained. Excitation of the mode shape shown reorients the tube 12 which is the directionally sensitive element in the component and impacts performance.

To reduce excursions from the desired linear shape of the tube 12, tuned mass dampers (TMDs) are attached to the tube at strategic locations to maximize the linearity of the tube. Maximum reduction in vibratory excursion (rigid body motion) of the tube as a whole is not required since vibration compensation may be accomplished for rigid body motion of the tube as a whole by employing systems known in the art such as the Steadicam® or similar systems. Consequently, location, tuning and control of the TMDs are maximized for maintaining the linear shape of the tube. As seen in FIG. 2, three TMDs 20a, 20b and 20c are located on the tube 12. The locations for mounting the TMDs are determined based on the nodes/antinodes of the resonant excursions and the axial direction of the excursions in the tube 12. For the example, TMD 20b is located at the central antinode 18b corresponding to the maximum deflection of the center of the tube 12 in FIG. 1B and TMDs 20a and 20b are located proximate the antinodes 18a and 18c at the ends of the tube 12. For the exemplary embodiment, the structure of the tube 12 includes flanges 22a and 22b separated by a web 24 as seen in FIGS. 3A-3C. TMDs 20a, 20b and 20c are mounted to the web 24 between the flanges 22a and 22b with an axis of motion for weights in the TMDs in the axial direction of the deflection of the tube 12.

Figure 4A:
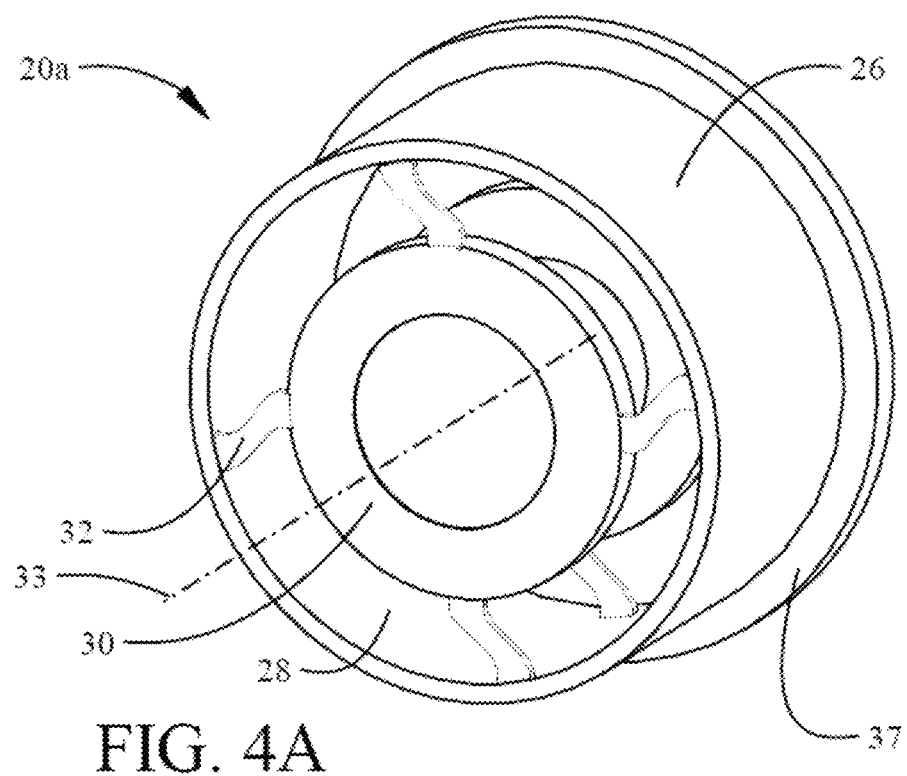
FIG. 4A is a perspective view of a first embodiment of an exemplary TMD employing inductive loss damping.
Figure 4B:
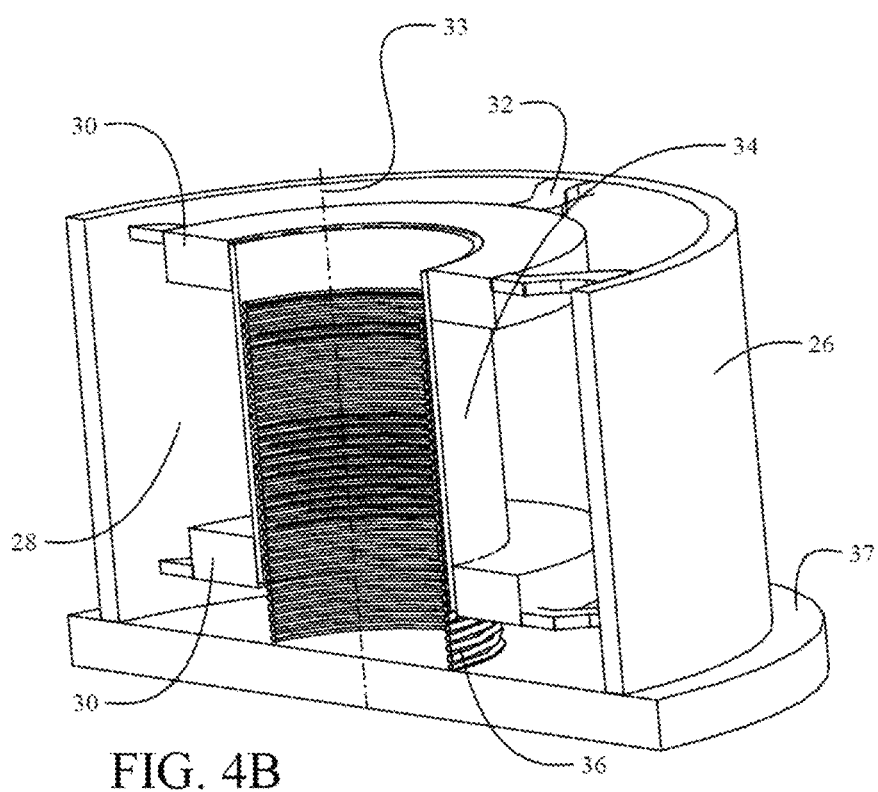
FIG. 4B is a sectioned perspective view of the first TMD embodiment.
Figure 4C:
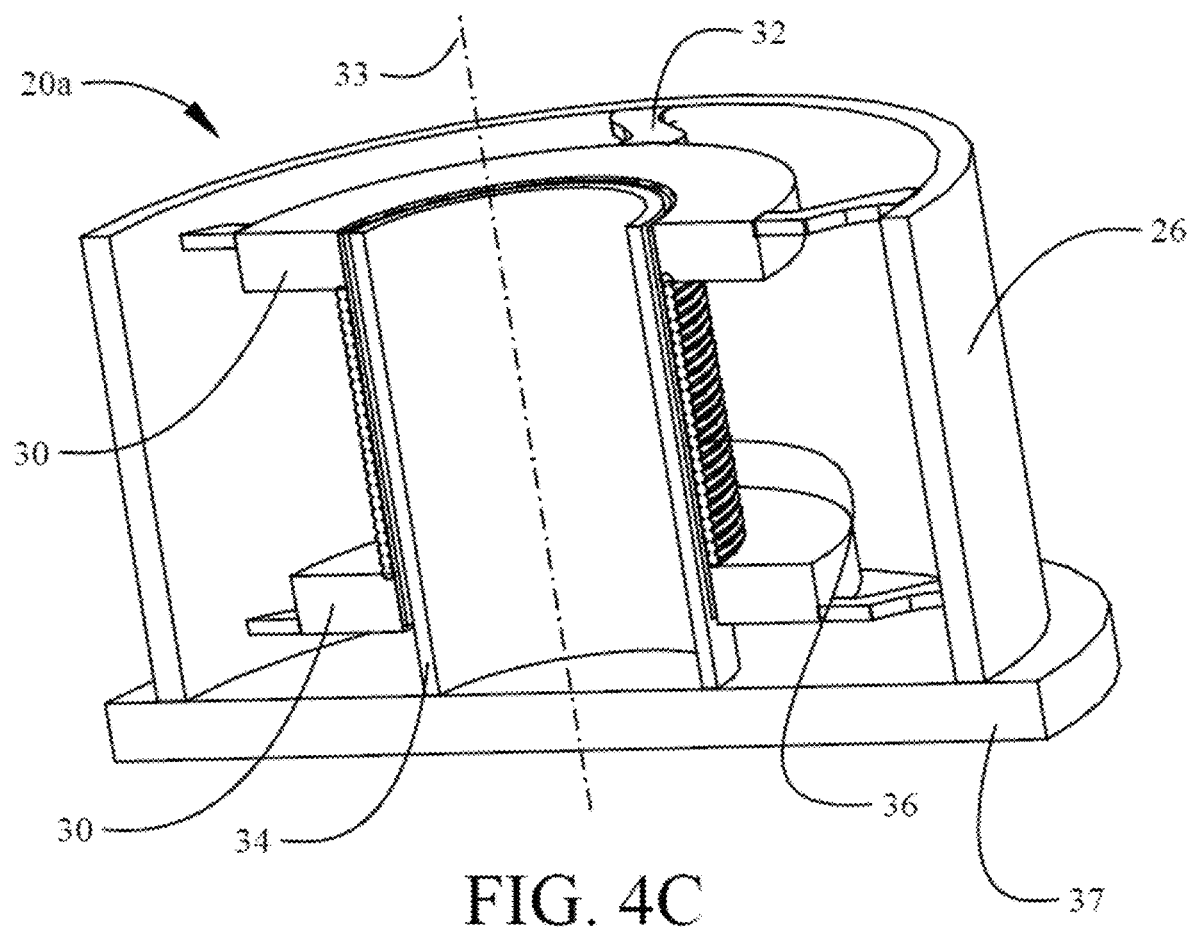
FIG. 4C is a sectioned perspective view of an alternative arrangement of the inductive loss damping TMD.

The TMDs 20a, 20b and 20c must include a loss mechanism that adds damping to the uncoupled tuned mass damper resonance at large and small amplitudes. The TMDs should also be durable when exposed to normal and extreme aircraft loads. For an exemplary embodiment details of a first form of TMDs employed as TMDs 20a, 20b and 20c are shown in FIGS. 4A and 4B. The TMD has a housing 26 that is generally cylindrical with a cavity 28 in which a pair of moving weights 30 are suspended by flexures 32. The flexures for the embodiment shown are "S" shaped to allow long throw motion along an active axis 33 that is aligned with the deflection direction of the tube 12. Cylindrical magnet 34 connecting the weights 30 provides a moving field assembly for inductive damping using a coil 36 as a fixed former. The magnet may alternatively be fixed and the coil moving as shown in FIG. 4C. Inductive loss is employed for damping of the uncoupled TMD and may be created using a simple resistance tied to the coil 36 or a more capable control system as will be described subsequently. The active axis 33 is aligned with the particular axis of excitation of the component in which damping for maintaining linear shape of the directionally sensitive element is desired. A base 37 extending from the case 26 is provided on the TMD for attachment to the component; the tube 12 in the exemplary embodiment.

Figure 4D:
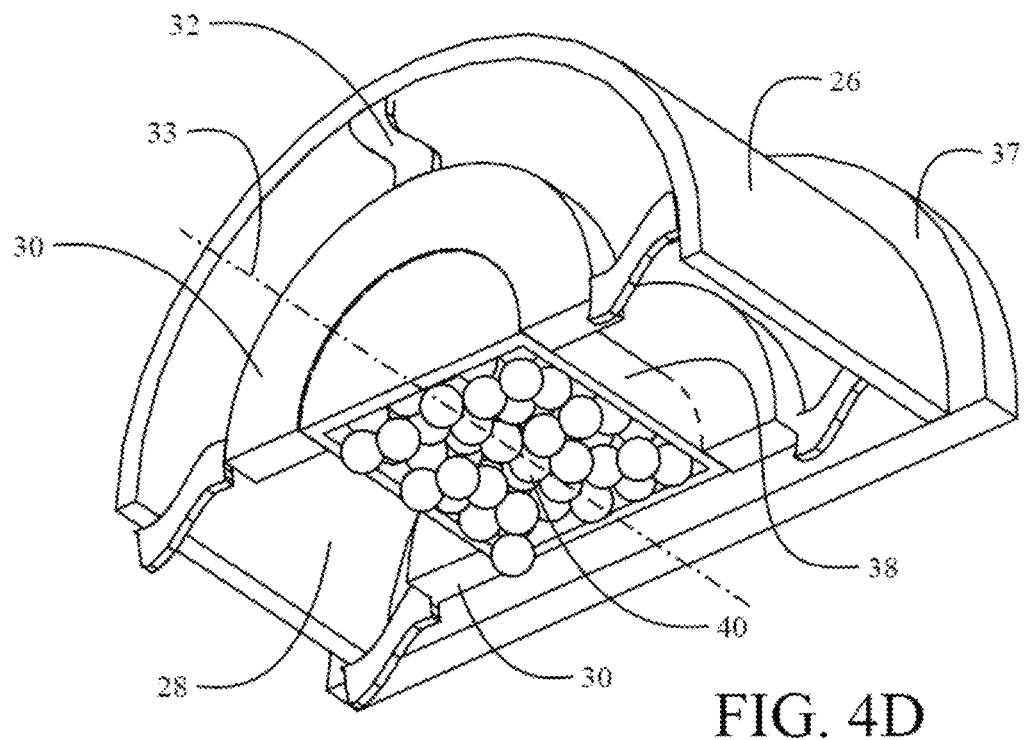
FIG. 4D is a sectioned perspective view of an alternative TMD embodiment employing particle damping.
Figure 4E:
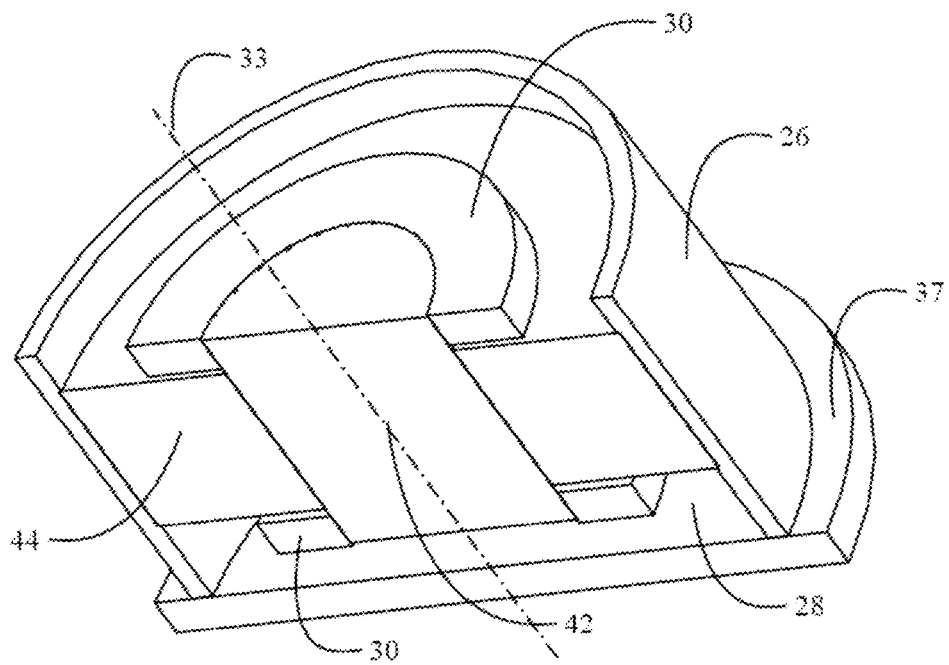
FIG. 4E is a sectioned perspective view of a second alternative TMD embodiment employing viscoelastic damping.

A first alternative example for a TMD employable as the TMDs 20a, 20b and 20c is shown in FIG. 4D wherein the inductive loss system is replaced with a particle damper. The weights 32 are joined by a cylindrical container 38 in which a plurality of particles 40 are contained. Inertial reaction of the particles 40 within the container 38 provides damping loss for the TMD. A second alternative employing viscoelastic damping is shown in FIG. 4E wherein the weights 32 may be suspended with an axle 42. The flexures are replaced with a viscoelastic washer 44 engaged between the axle 42 and the case 26 to damp the axial motion of the weights.

Figure 5A:
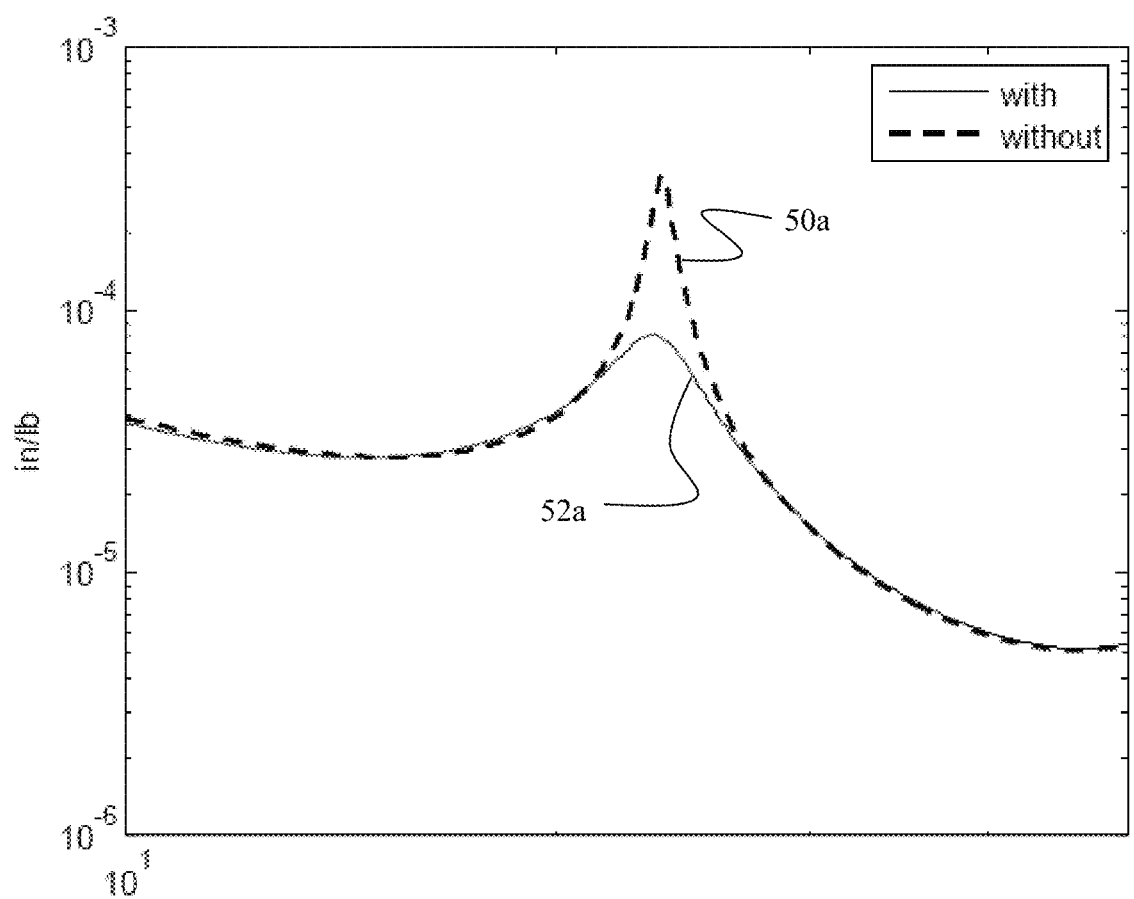
FIGS. 5A-5C are graphs showing undamped and damped displacement of antinodes of the tube.
Figure 5B:
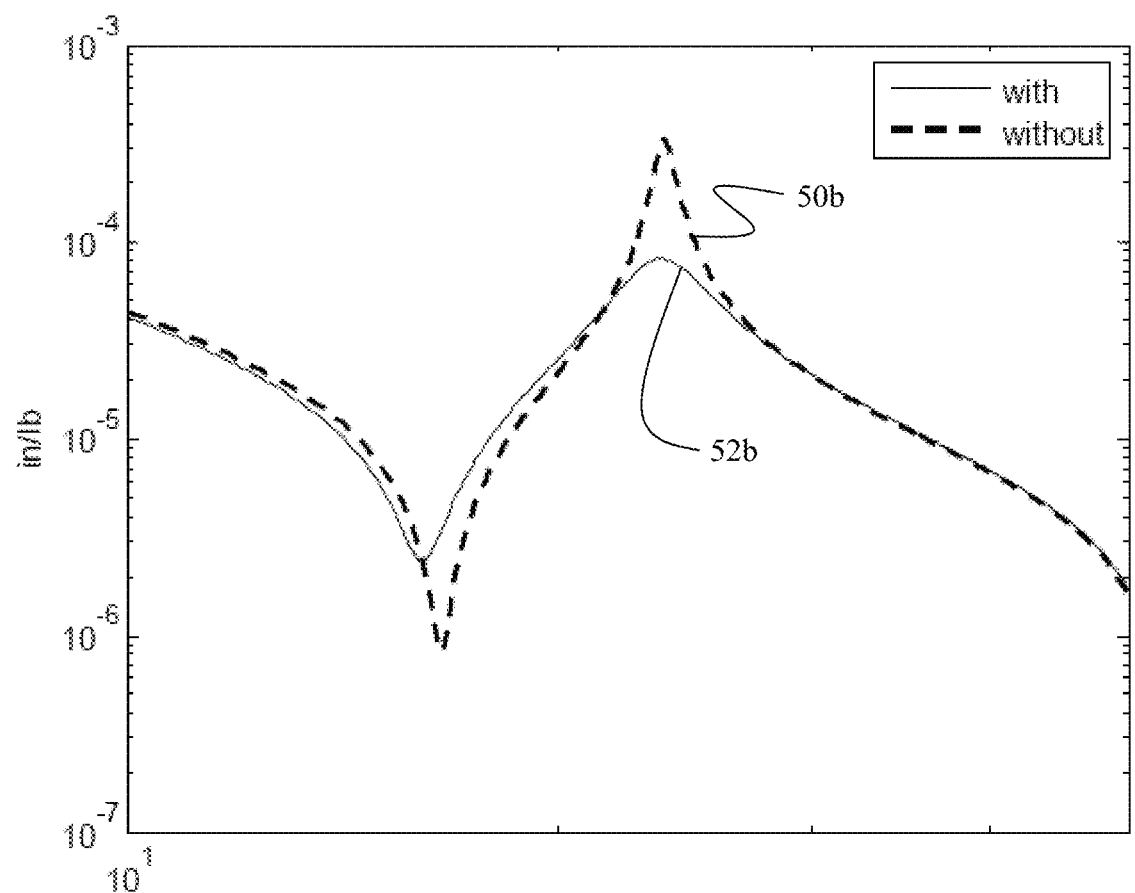
Figure 5C:
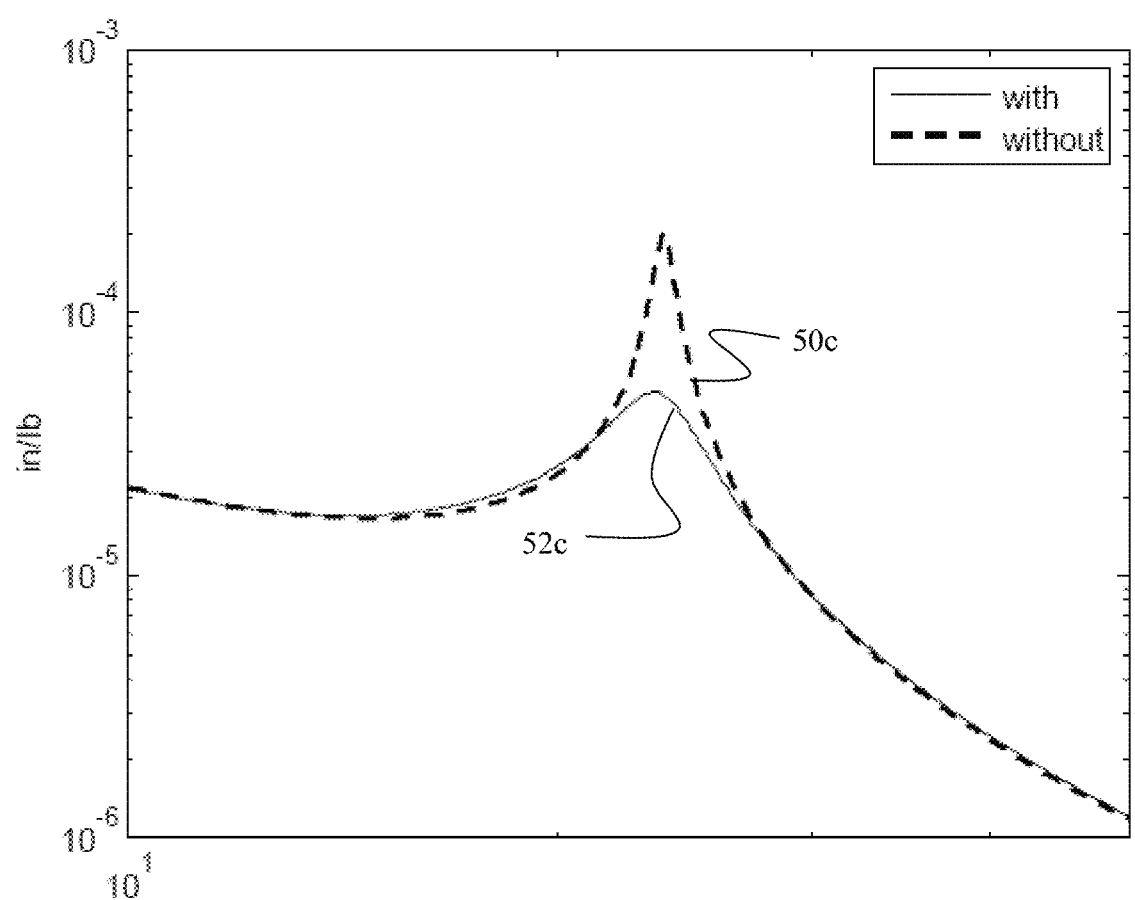

For the example tube 12 is a carbon composite structure of approximately 7000 lbs with the depicted initial mode shape induced at 24 Hz as previously described with respect to FIG. 2 and using TMDs employing inductive loss as described with respect to FIGS. 4A and 4B, the displacement at resonance for the front antinode 18a, is reduced as shown in FIG. 5A from an undamped excursion as shown by trace 50a to a limited excursion as shown by trace 52a. Similarly at the center antinode 18b as shown in FIG. 5B, the undamped excursion as shown by trace 50b is damped to the limited excursion as shown by trace 52b. At the aft antinode 18b as shown in FIG. 5B, the undamped excursion as shown by trace 50c is damped to the limited excursion as shown by trace 52c.

Figure 6:
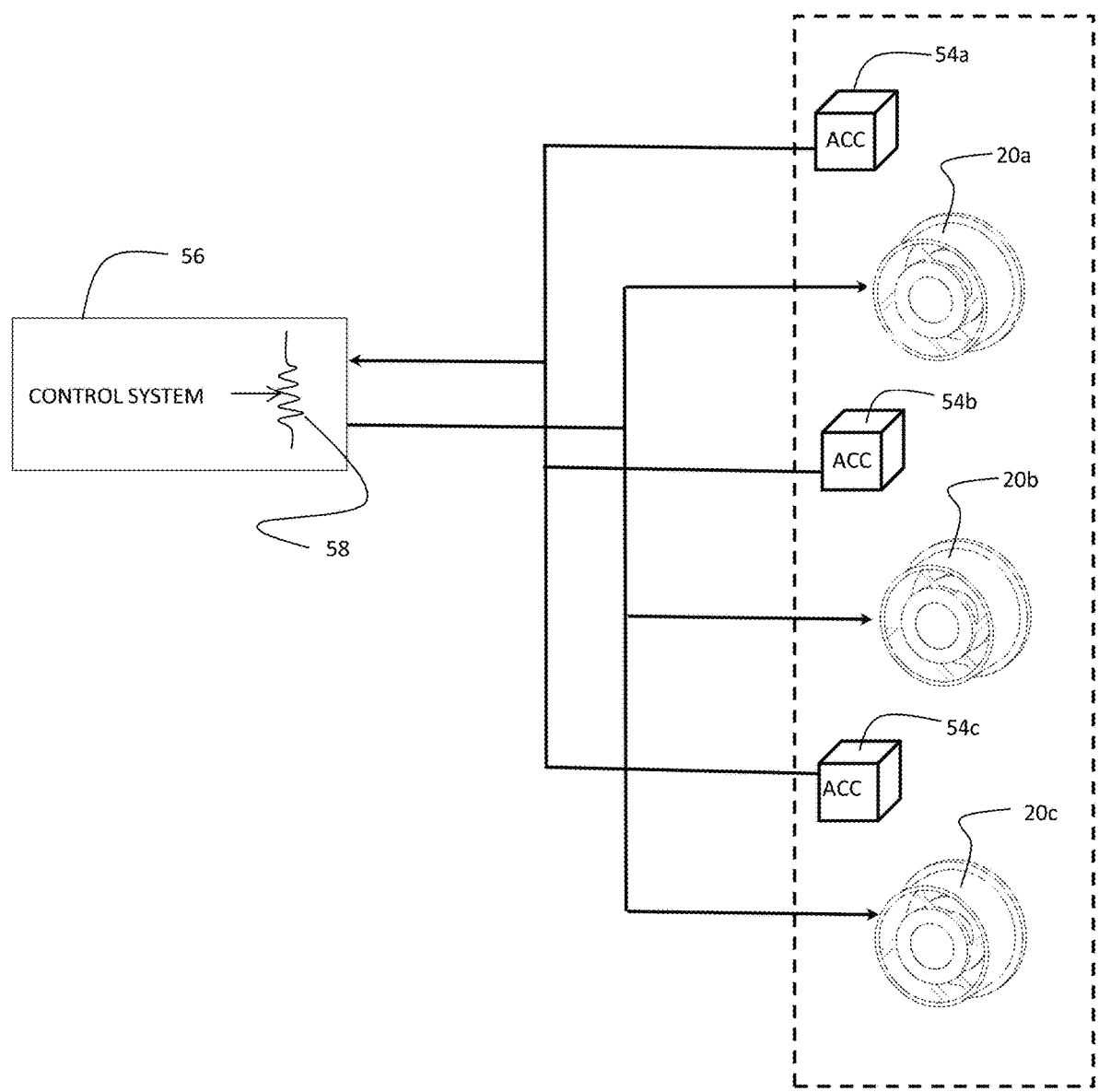
FIG. 6 is a block diagram of a dynamic inductive loss control system for active damping.

The inductive loss provided by the TMDs described with respect to FIGS. 4A, 4B and 4E may be enhanced as an active system as shown in FIG. 6 wherein accelerometers 54a, 54b and 54c are mounted to the tube 12 in association with TMDs 20a, 20b and 20c with magnets 34 and coils 36 in a voice coil configuration to provide acceleration signals to a control system 56. In alternative embodiment various sensors such as strain gages may replace or supplement the accelerometers. The sensors may be active out of the plane or specific direction in which damping is desired to provide a metric for increased damping in the specific direction. Control system 56 includes variable electrical impedance 58 providing a controlled local rate feedback loop to the TMDs.

Figure 7:
FIG. 7 is a comparison of displacement of the tube centerline in resonant vibration undamped; damped with the TMDs and damped with active control.

FIG. 7 demonstrates the efficacy of the TMDs in maintaining the linear shape of the tube 12 wherein trace 60b represents the centerline excursion without damping relative to a rest condition shown in trace 60a. Trace 60c shows the reduction in excursion with addition of TMDs as described herein. Trace 60d shows further reduction of the excursion when active damping is employed. For the exemplary carbon fiber rectangular tube as previously described, amplitude reduction of an additional 16% to only 10% of the original excursion of trace 60b.

Figure 8A:
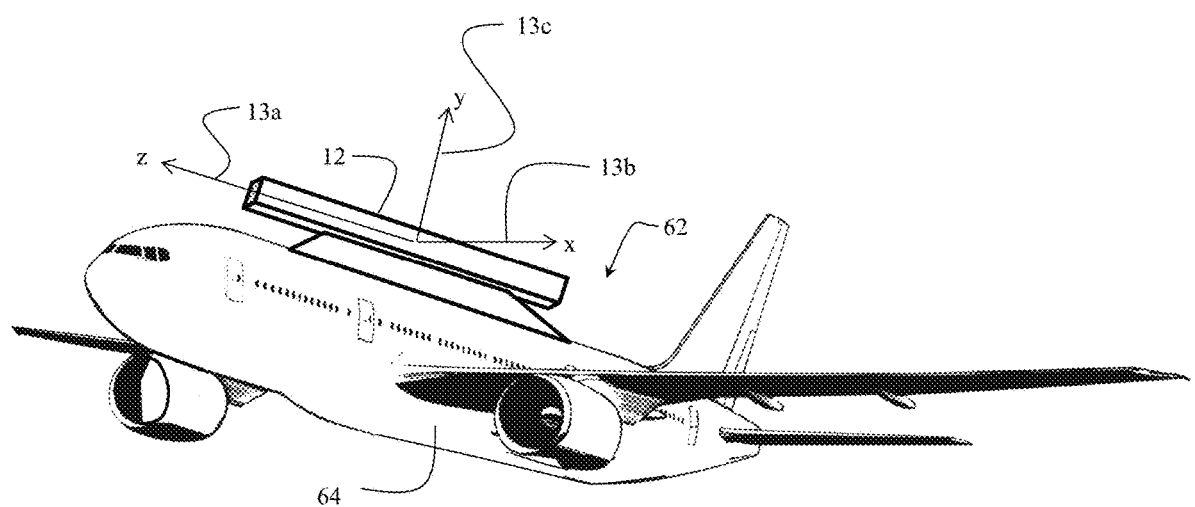
FIG. 8A is a perspective view of an aircraft on which a component employing the vibration control system is mounted.
Figure 8B:
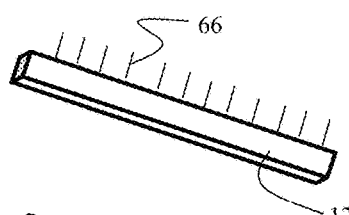
FIG. 8B is a perspective view of a second exemplary embodiment of the component.
Figure 8C:
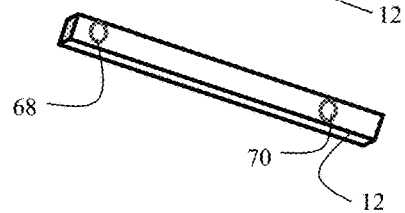
FIG. 8C is a perspective view of a third exemplary embodiment of the component; and, FIG. 9 is a flow chart of a method employing damping to maintain maximum linearity of a directionally sensitive component in a vibration environment.

FIG. 8A shows an exemplary implementation of the component 10 as described with respect to FIGS. 1A and 1B on an aircraft 62 wherein the tube 12 is mounted to a fuselage 64 of the aircraft. Shown in the embodiment as a dorsal (top) attachment, ventral (bottom) or side attachments would be comparable. The forward movement of the aircraft is substantially aligned with the "z" axis 13a of the component 10. Vibration induced by operation of the aircraft may be substantially in the direction defined by the "x" axis 13b lateral or side to side (yaw) with respect to the direction of movement of the aircraft, or substantially in the direction defined by the "y" axis 13c vertically or elevationally (pitch) with respect to direction of movement of the aircraft. As shown in FIG. 8B, the tube 12 also be employed as a mounting structure for antenna elements 66 which may be active antenna dipoles in an antenna array or may be passive elements for an antenna beam director such as aYagi-Uda array. Linear shape of the supporting structure created by tube 12 is required for effective operation of the antenna. Similar to the laser transmission system of the originally described embodiment other optical element trains as shown in FIG. 8C may also benefit from the stabilizing embodiments as disclosed. A transmission or receiving lens 68 with a mating optical source or collector 70, respectively, for use in an RF energy emitting device, telescope or weapons targeting system may be supported by the tube 12. While described for the various embodiments as a rectangular tube 12, the basic support structure of the component may be any geometric structure satisfactory to support the operational elements of the component 10.

Figure 9:
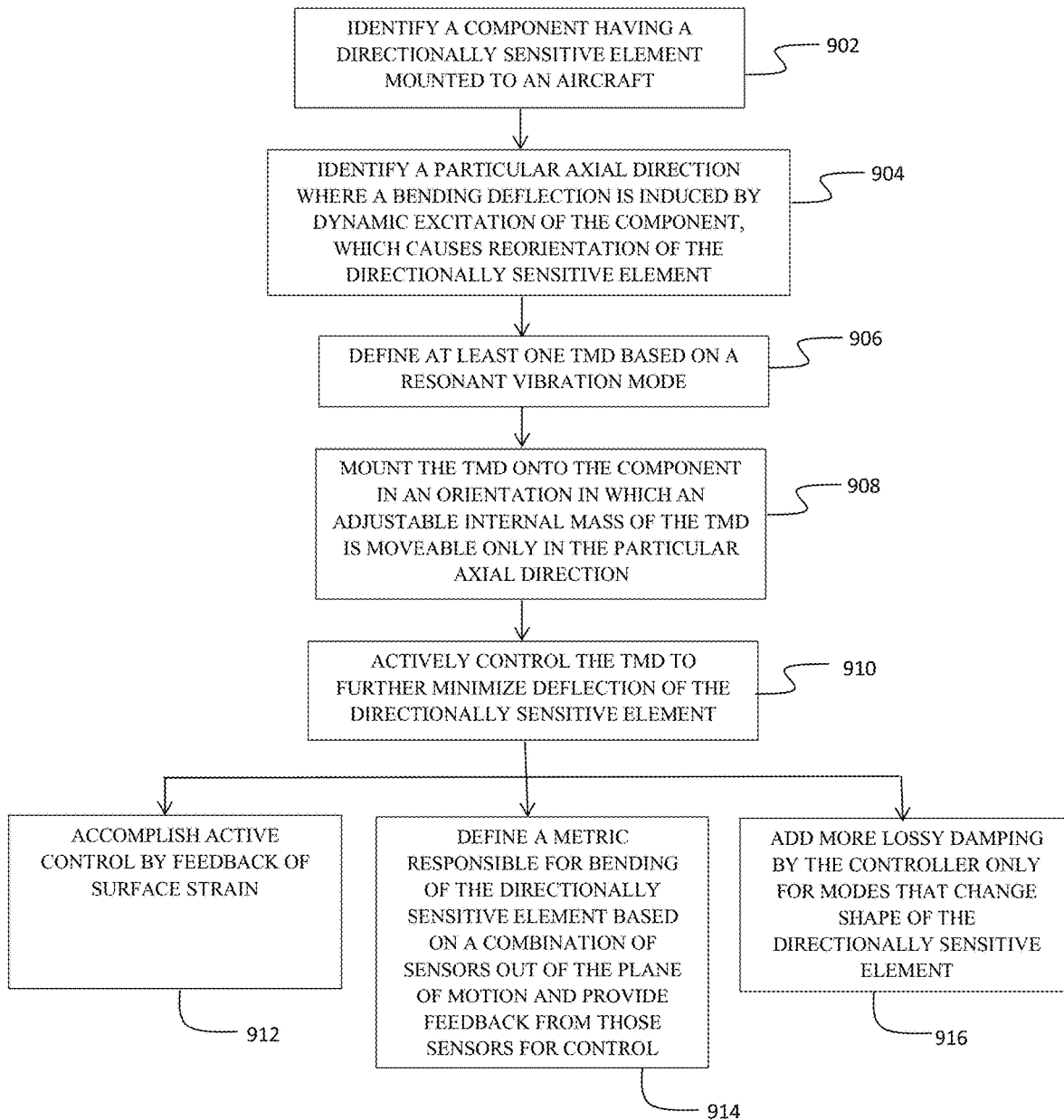

The embodiments disclosed provide the basis for a method for applying a tuned mass damper apparatus to an aircraft component as shown in FIG. 9 A component having a directionally sensitive element mounted to an aircraft is identified, step 902. A particular axial direction is identified in which a bending deflection is induced by dynamic excitation of the component, which causes reorientation of the directionally sensitive element, step 904. At least one TMD is defined based on a resonant vibration mode, step 906, and, the TMD is mounted onto the component in an orientation in which an adjustable internal mass of the tuned mass damper is moveable only in the particular axial direction, step 908. The tuned massed damper absorbs and attenuates the deflective motion in the component in the specific axial direction to suppress bending deformation of the component in the axial direction for maintaining the linear shape of the directionally sensitive element. In a typical embodiment a plurality of TMDs are mounted at resonant antinodes on the component. As previously described, the TMDs may be actively controlled to further minimize deflection of the directionally sensitive element, step 910. Control may be accomplished by feedback of surface strain, step 912, as opposed to out of plane deflection to control bending. Alternatively, a metric responsible for bending of the directionally sensitive element may be defined based on a combination of sensors out of the plane of motion and feedback provided from those sensors for control, step 914. As a second alternative, more lossy damping is added by the controller only for modes that change shape of the directionally sensitive element, step 916.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A vibration damping system comprising:
    a component having a directionally sensitive element with a first axis mounted to an aircraft, said component experiencing dynamic excitation that induces bending deflection in the component in a second axial direction perpendicular to the first axis that will reorient the directionally sensitive element;
    a plurality of tuned mass dampers each having an active axis mounted on the component in an orientation with the active axis aligned with the second axial direction wherein an internal mass of the tuned mass damper is moveable along the active axis such that the tuned massed damper absorbs and attenuates at least a portion of the deflective motion in the second axis only, wherein the internal mass comprises a pair of movable weights that are connected by a cylindrical magnet providing a moving field assembly for inductive damping using a fixed coil, said plurality of tuned mass dampers tuned to attenuate deflective motion of the component in only the second axial direction that contributes to deflection and movement of the directionally sensitive element and thereby suppress bending deflection of the component in the second axial direction to solely maximize maintaining a linear shape of the directionally sensitive element and wherein reduction in vibratory excursion of the component as a whole is not maximized.

2. The system of claim 1 wherein the component is mounted on the exterior of an aircraft.

3. The system of claim 1 wherein the second axial direction is in a lateral direction relative to forward movement of the aircraft.

4. The system of claim 1 wherein the second axial direction is in a vertical direction relative to forward movement of the aircraft.

5. The system of claim 3 wherein directionally sensitive element is one of an antenna array, an antenna beam director, an RF energy emitting device, a laser device, a telescope and a weapons targeting system.

6. The system of claim 1 wherein each tuned mass damper includes a loss mechanism to tune an attenuation response of the tuned mass damper.

7. The system of claim 6 wherein the loss mechanism comprises inductive damping.

8. The system of claim 7 wherein the fixed coil is concentrically received within the cylindrical magnet.

9. The system of claim 8 wherein damping is determined by a resistor in series with the coil.

10. The system of claim 9 wherein the magnet and coil comprise a voice coil and further comprising an active damping controller.

11. A method for applying a tuned mass damper apparatus to an aircraft component, comprising:
    identifying a component having a directionally sensitive element mounted to an aircraft, said component having a first axis;
    identifying a second axial direction perpendicular to the first axis in which a bending deflection is induced by dynamic excitation of the component, which causes reorientation of the directionally sensitive element; and
    mounting a plurality of tuned mass dampers each having an active axis onto the component in an orientation with the active axis is parallel to the second axial direction wherein an adjustable internal mass of the tuned mass damper is moveable only along the active axis, wherein the internal mass comprises a pair of movable weights that are connected by a cylindrical magnet providing a moving field assembly for inductive damping using a fixed coil, such that the plurality of tuned massed dampers absorbs and attenuates the deflective motion in the component in the second axial direction that contributes to deflection and movement of the directionally sensitive element only, thereby suppressing bending deformation of the component in the second axial direction to solely maximize maintaining a linear shape of the directionally sensitive element without maximizing reduction in vibratory excursion of the component as a whole.

12. The method as defined in claim 11 wherein the step of mounting at least one tuned mass damper comprises mounting a plurality of tuned mass dampers at resonant antinodes on the component.

13. The method as defined in claim 12 further comprising selecting a tuned mass damper having loss from inductive damping.

14. The method as defined in claim 13 further comprising:
mounting an accelerometer associated with the tuned mass damper;
receiving accelerometer data in a control system; and,
actively tuning the inductive loss in each tuned mass damper to maximize linear shape of the directionally sensitive element.

15. The method as defined in claim 14 wherein the step of actively tuning comprises providing a control loop with an electrical impedance that increases the damping at a resonant vibration mode.

16. The method as defined in claim 14 wherein the step of actively tuning comprises providing a feedback of surface strain to control damping.

17. The method as defined in claim 14 wherein the step of actively tuning comprises providing feedback from a combination of sensors of out of plane motion and employing said feedback from those sensors for control of damping.

18. The method as defined in claim 14 wherein the step of actively tuning comprises adding more lossy damping only for modes that change shape of the directionally sensitive element.

19. A vibration damping system comprising:
a component having a directionally sensitive element with a first axis mounted to an aircraft, said component experiencing dynamic excitation that induces bending deflection in the component in a second axial direction perpendicular to the first axis and in a lateral direction relative to forward movement of the aircraft that will reorient the directionally sensitive element;
a plurality of tuned mass dampers each having an active axis mounted on the component in an orientation with the active axis aligned with the second axial direction wherein an internal mass of the tuned mass damper is moveable along the active axis such that the tuned massed damper absorbs and attenuates at least a portion of the deflective motion in the second axis only, wherein the internal mass comprises a pair of movable weights that are connected by a cylindrical magnet providing a moving field assembly for inductive damping using a fixed coil, said plurality of tuned mass each providing an attenuation response tuned to attenuate deflective motion of the component in only the second axial direction that contributes to deflection and movement of the directionally sensitive element and thereby suppress bending deflection of the component in the second axial direction to solely maximize maintaining a linear shape of the directionally sensitive element and wherein reduction in vibratory excursion of the component as a whole is not maximized.

20. The system of claim 19 wherein the fixed coil is mounted to be concentrically received within the cylindrical magnet for generating a field that affects movement of a magnet wherein damping is determined by a resistor in series with the coil.

21. The system of claim 19 wherein the magnet and coil comprise a voice coil and further comprising an active damping controller.

* * * * *